US006480879B1

United States Patent
Zinky et al.

(10) Patent No.: US 6,480,879 B1
(45) Date of Patent: Nov. 12, 2002

(54) FRAMEWORK FOR PROVIDING QUALITY OF SERVICE REQUIREMENTS IN A DISTRIBUTED OBJECT-ORIENTED COMPUTER SYSTEM

(75) Inventors: John A. Zinky, Cambridge, MA (US); Richard R. Schantz, Sharon, MA (US); David E. Bakken, Londonderry, NH (US); Joseph P. Loyall, Tewksbury, MA (US); Rodrigo Vanegas, Boston, MA (US)

(73) Assignees: Genuity Inc., Burlington, MA (US); Verizon Corporate Services Group Inc., New York, NY (US)

( * ) Notice: Subject to any disclaimer, the term of this patent is extended or adjusted under 35 U.S.C. 154(b) by 0 days.

(21) Appl. No.: 09/220,716

(22) Filed: Dec. 24, 1998

Related U.S. Application Data

(60) Provisional application No. 60/077,870, filed on Mar. 13, 1998.

(51) Int. Cl.[7] .................................................. G06F 15/16
(52) U.S. Cl. ........................ 709/201; 709/223; 709/224; 370/332
(58) Field of Search ................................. 709/201, 203, 709/223, 224, 228, 231, 246; 370/332; 710/18

(56) References Cited

U.S. PATENT DOCUMENTS

| | | | |
|---|---|---|---|
| 6,003,079 A | * 12/1999 | Friedrich et al. | ............ 709/224 |
| 6,055,493 A | * 4/2000 | Ries et al. | ...................... 2/186 |
| 6,061,724 A | * 5/2000 | Ries et al. | ................... 709/224 |
| 6,141,565 A | * 10/2000 | Feuerstein et al. | ........... 455/560 |
| 6,189,046 B1 | * 2/2001 | Moore et al. | ................... 9/315 |

OTHER PUBLICATIONS

Specifying and measurig quality of service in distributed object systems, Loyall, J.P.; Schantz, R.E.; Zinky, J.A.; Bakken, D.E., BBN Technology, Cambridge, MA, USA, ISBN: 0–8186–8430–5, pp. 43–52.*

David E. Bakken, Object–Oriented QoS for C2 Adaptivity and Evolvability, DARPA Workshop on Security Technology for Next–Generation C2 Systems, Institute for Defense Analyses, Alexandria VA, Jul. 29–30, 1996; (http://www.d-ist–systems.bbn.com/papers/1996/paper–96–01/paper–96–01.html printed Feb. 6, 1998 pp. 1–4.

Steve Vinoski et al., CORBA: Integrating Diverse Applications Within Distributed Heterogeneous Environments, IEEE Communications Magazine, vol. 35, No. 2, Feb. 1997; pp. 1–12.

John A. Zinky, Architectural Support for Quality of Service for CORBA Objects, Theory and Practice of Object Systems, Jan. 1997, pp. 55–73.

Robert Orfali et al., Chapter 2, The Essential Distributed Objects Survival Guide, John Wiley & sons, 1996, 24–29.

Robert Orfali et al., Chapter 4, The Essential Distributed Objects Survival Guide, John Wiley & sons, 1996, 68–90.

* cited by examiner

*Primary Examiner*—Mehmet B. Geckil
*Assistant Examiner*—Beatriz Prieto
(74) *Attorney, Agent, or Firm*—Leonard Charles Suchyta; James K. Weixel

(57) ABSTRACT

A distributed system provides a quality of service by generating at least one system condition object storing a value, monitoring at least one resource in real time using the system condition object, and setting the value of the system condition object in response to the monitoring of the resource. The system determines a current quality of service based on the value stored in the system condition object. The system then regulates activity within the distributed system based on the determined quality of service.

9 Claims, 11 Drawing Sheets

```
contract repl_contract(
      syscond ValueSC ValueSCImpl ClientExpectedReplicas,
      callback AvailCB ClientCallback,
      syscond ValueSC ValueSCImpl MeasuredNumberReplicas,
      syscond ReplSC ReplSCImpl ReplMgr ) is negotiated regions are
    region Low-Cost : when ClientExpectedReplicas == 1 =>
      reality regions are
        region Low     : when MeasuredNumberReplicas < 1 =>
        region Normal  : when MeasuredNumberReplicas == 1 =>
        region High    : when MeasuredNumberReplicas > 1 =>
        transitions are
          transition any->Low  :
ClientCallback.availability_degraded();
          transition any->Normal :
ClientCallback.availability_back_to_normal();
          transition any->High  :
ClientCallback.resources_ being_wasted ();
        end transitions;
      end reality regions;
    region Available  : when ClientExpectedReplicas >= 2 =>
      reality regions are
        region Low    : when MeasuredNumberReplicas <
ClientExpectedReplicas =>
        region Normal : when MeasuredNumberReplicas >=
ClientExpectedReplicas =>
        transitions are
          transition any->Low
ClientCallback.availability_degraded ();
          transition any->Normal :
ClientCallback.availability_back_to_normal();
        end transitions;
      end reality regions;
    transitions are
      transition Low_Cost->Available :
        ReplMgr.adjust_degree_of_replication(ClientExpectedReplicas);
      transition Available->Low_Cost :
        ReplMgr.adjust_degree_of_replication(ClientExpectedReplicas);
    end transitions;
  end negotiated regions;
end repl_contract;
```

FIG. 6

```
delegate behavior for SomeType and SomeContract is
   call someMethod :
      region Increment    :
         pass_through
      region Decrement    :
         { retval = altMethod(arg) ;  }
   default :
      pass-through
end delegate behavior;
```

FIG. 7

FRAMEWORK FOR PROVIDING QUALITY OF SERVICE REQUIREMENTS IN A DISTRIBUTED OBJECT-ORIENTED COMPUTER SYSTEM

RELATED APPLICATIONS

This application is related to and claims the benefit of the filing date of U.S. provisional application, Ser. No. 60/077,870, filed Mar. 13, 1998, which is hereby incorporated by reference. Also, this application is related to copending applications, Ser. No. 09/220,511 and Ser. No. 09/220,530, filed concurrently herewith and hereby incorporated by reference.

GOVERNMENT CONTRACTS

The U.S. Government has a paid-up license in this invention and the right in limited circumstances to require the patent owner to license others on reasonable terms as provided for by the terms of the following contracts: F30602-96-C-0315; N66001-96-C-p8529; and F30602-94-C-0188.

FIELD OF THE INVENTION

The present invention relates generally to distributed computing networks and, more particularly, to a system that provides quality of service across a distributed object-oriented computer network.

DESCRIPTION OF RELATED ART

The development and deployment of distributed applications has proliferated in recent years in part due to the creation of middleware. Middleware refers to a layer of software between the application and communication layers that offers a consistent, higher-level abstraction throughout the network. Middleware makes distributed applications easier to develop by facilitating communication between distributed applications.

An increasingly important category of distributed applications includes multimedia applications, such as video-on-demand. Multimedia applications demand high-performance communication layers. To meet these demands, communication layers offer features, such as quality of service (QoS) and multicasting, for multimedia applications to exploit. QoS refers to specific system performance requirements, such as the amount of a specific resource or group of resources devoted to satisfying a client (or caller) application's request. QoS allows for the reservation of guaranteed system properties. System properties include operational attributes, such as throughput and delay. Since these QoS features are offered only at the communication layer, new middleware must be developed to provide the application layer with access to these features.

Common Object Request Broker Architecture (CORBA) is middleware that was developed to facilitate such access. CORBA's interface description language (IDL) provides an important base for developing distributed applications because the IDL describes the programmatic interface to an object, including the type signature (i.e., a list of input and output parameters, along with the data types of each of the parameters) of the operations which the object embodies, independent of the underlying programming language, operating system, and communication medium. Through the programmatic interface, the IDL allows a programmer to develop a distributed application rapidly and transparently, without regard to the underlying services.

CORBA's IDL hides implementation details. As a result, distributed applications based on CORBA's IDL operate properly only as long as resources are plentiful. For example, distributed applications operate well where the programmers have prior knowledge of the system properties under which their code will execute and these properties remain relatively constant, such as where objects are either local (i.e., in the client's address space) or within the same local area network (LAN), and resources are plentiful.

In wide-area distributed environments, however, system properties are more dynamic, hostile, and less understood. This is a consequence of changing conditions, such as high delays, frequent failures, and low bandwidth, in the distributed system and the fact that programmers have no prior knowledge of these changing conditions.

As a result, usage patterns, QoS requirements, and underlying resources must be managed in order for a distributed application to operate properly over a wide-area network. Unfortunately, these features are precisely what is being hidden by the functional interface described by the IDL. To make a distributed application perform adequately, additional details regarding the design decisions embodied in an implementation of an object must be made available without sacrificing the software engineering gains, such as transparency, obtained by using object-oriented techniques.

A compounding factor that programmers face when developing distributed applications is that programmers are only used to handling the ideal system properties of local objects and not the dynamic system properties of distributed objects, such as their QoS properties. The system properties of local objects are considered ideal because the local objects do not fail independently of a client once they are created, and the delay for invoking a method is negligible.

Unfortunately, the system properties of distributed objects are far from ideal: they can fail unexpectedly and independently from a client, and the delay for a method invocation to return may be long due to communication overhead, for example. As a result, programmers typically include extra code with most invocations to remote objects to handle errors and performance conditions. Programmers find this coding very difficult to do, and the coding makes it even more difficult for programs to be used in an environment different from that for which they were originally hardcoded. Worse yet, the coding negates the benefits provided by the transparent interface definitions of the IDL.

Yet another factor that programmers encounter when they manage system properties in a distributed environment is that the information about the system properties becomes available at different times, in different locations, and from different sources. For example, information regarding system properties may come from many locations in a distributed system, such as from the client, the object, the communication layer, and the resources connecting them. The information may also come from many sources within the distributed system, such as the object designer, the client designer, the operations staff, and the end-user of the distributed application. If any of this information becomes unavailable for some reason, the distributed application will perform poorly.

Therefore, a need exists for a framework that supports QoS across wide-area and mobile environments to facilitate proper design and execution of distributed applications.

SUMMARY OF THE INVENTION

Systems and methods consistent with the present invention address this need through a quality objects (QuO)

framework that includes a system of software components that provide a general purpose mechanism for the specification and satisfaction of application quality of service (QoS) requirements in a distributed, object-oriented computer software system. The QuO framework integrates knowledge of system properties over time, space, and source to facilitate proper operation of a distributed application.

In accordance with the purpose of the invention as embodied and broadly described herein, a system provides a quality of service by generating at least one system condition object storing a value, monitoring at least one resource in real time using the system condition object, and setting the value of the system condition object in response to the monitoring of the resource. The system determines a current quality of service based on the value stored in the system condition object. The system then regulates activity within the distributed system based on the determined quality of service.

BRIEF DESCRIPTION OF THE DRAWINGS

The accompanying drawings, which are incorporated in and constitute a part of this specification, illustrate an embodiment of the invention and, together with the description, explain the objects, advantages, and principles of the invention. In the drawings.

FIG. 6 is an exemplary diagram of a CDL description of a simplified version of the contract shown in FIG. 4;

FIG. 7 is an exemplary diagram of a SDL description of a simplified version of a delegate;

DETAILED DESCRIPTION

Figure 1:
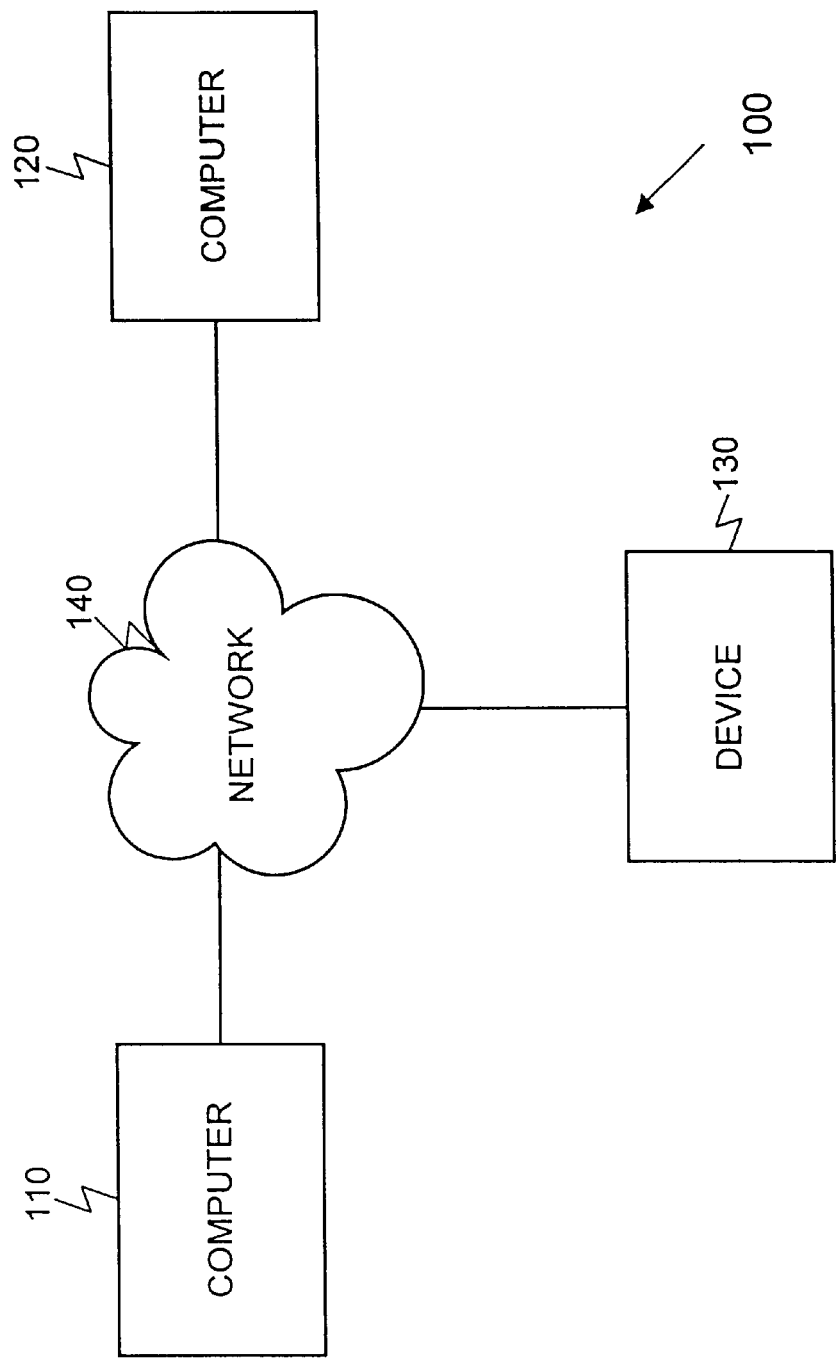
FIG. 1 is a diagram of an exemplary distributed system consistent with the present invention.

The following detailed description of the invention refers to the accompanying drawings. The description includes exemplary embodiments, other embodiments are possible, and changes may be made to the embodiments described without departing from the spirit and scope of the invention. The following detailed description does not limit the invention. Instead, the scope of the invention is defined by the appended claims.

Systems and methods consistent with the present invention provide a general purpose mechanism for the specification and satisfaction of application quality of service (QoS) requirements in a distributed, object-oriented computer software system. QoS refers to system performance requirements, such as the amount of a specific system resource or group of system resources that are devoted to satisfying a client object's request.

Through the use of this general purpose mechanism, a programmer obtains information regarding the dynamic system properties of the distributed system to facilitate the development of distributed, object-oriented applications. The mechanism supports QoS by permitting a client program in the distributed system to request a desired QoS, monitoring system conditions to provide the requested QoS, and reporting deviations to the client program to allow the program an opportunity to adapt to changes in the system conditions.

OVERVIEW OF THE DISTRIBUTED SYSTEM

Systems and methods consistent with the present invention operate within a quality objects (QuO) framework that includes a system of software components providing a mechanism for the specification and satisfaction of application QoS requirements in a distributed, object-oriented computer system with various components, including both hardware and software.

The QuO framework provides: (1) a software mechanism (a "contract") used by client software components to specify the QoS required, independent of the specific type of resource being requested; (2) a software mechanism (a "system condition") used by the system to provide real-time control over and visibility into third party software components that provide QoS assurances; (3) a software mechanism (a "delegate") used by client software components to adapt run-time behavior to the actual QoS being delivered by the system; and (4) a multi-tier adaption scheme that provides notification to the client when the actual QoS delivered varies from the QoS specified in the contract.

An exemplary distributed system includes various logical groupings of objects provided by one or more devices. An "object" refers to a resource, data, or functionality that can be accessed by a user, program, device, or another object and that can be computational, storage-related, communication-related, or related to providing access to another user. Examples of objects include software, such as applications or utilities; information, such as databases and files; and users of the system.

In an interaction between two software objects within the exemplary distributed system, the "client" object requests services from the "server" object. The client and server objects may physically reside on a single computer or on multiple computers. QoS refers to the amount of resources that are devoted to satisfying the client's request. Examples of system resources include network communications, memory, disk storage, encrypted communications, replication of server objects, and central processing unit (CPU) utilization.

FIG. 1 depicts an exemplary distributed system 100 containing a computer 110, a computer 120, and a device 130 interconnected by a network 140. The computers 110 and 120 may include any conventional computers, such as IBM-compatible computers, workstations, or even "dumb" terminals. During typical operation, computers 110 and 120 may establish a client-server relationship to transmit and retrieve data.

The device 130 may be any of a number of devices, such as a printer, fax machine, storage device, computer, or other devices. The network 140 is a wide area network or the Internet. Although only two computers and one device are depicted as comprising the exemplary distributed system 100, one skilled in the art will appreciate that the system 100 may include additional computers or devices.

Figure 2:
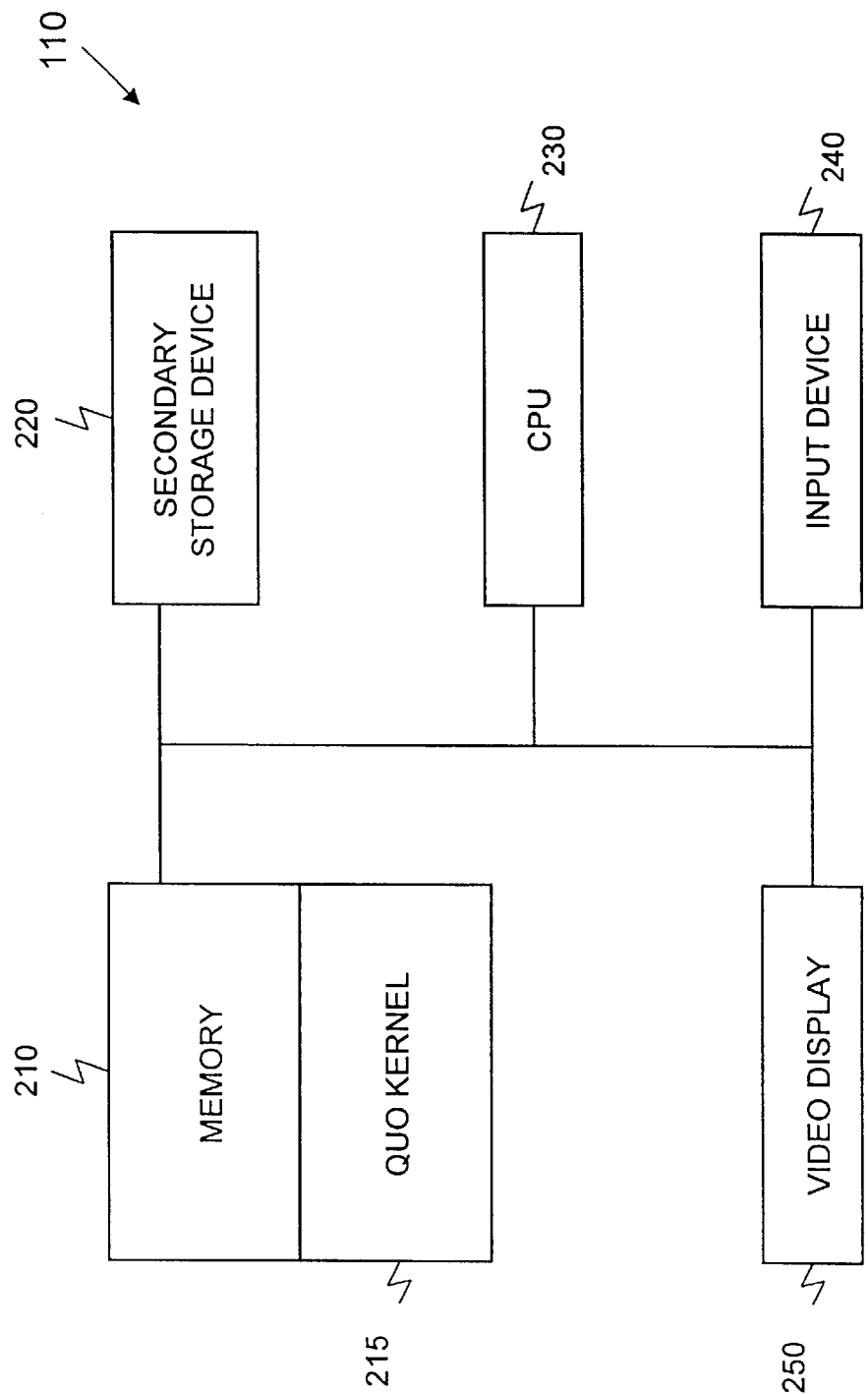
FIG. 2 is a detailed diagram of a computer in the distributed system of FIG. 1.

FIG. 2 depicts the computer 110 in greater detail to show a number of components operating within the exemplary distributed system 100. One skilled in the art will appreciate that computer 120 or device 130 may be similarly configured. Computer 110 includes a memory 210, a secondary storage device 220, a central processing unit (CPU) 230, an input device 240, and a video display 250. The memory 210 includes a QuO kernel 215. The QuO kernel 215 is a run-time system responsible for the creation, maintenance, and invocation of various software components within the distributed system 100.

Figure 3:
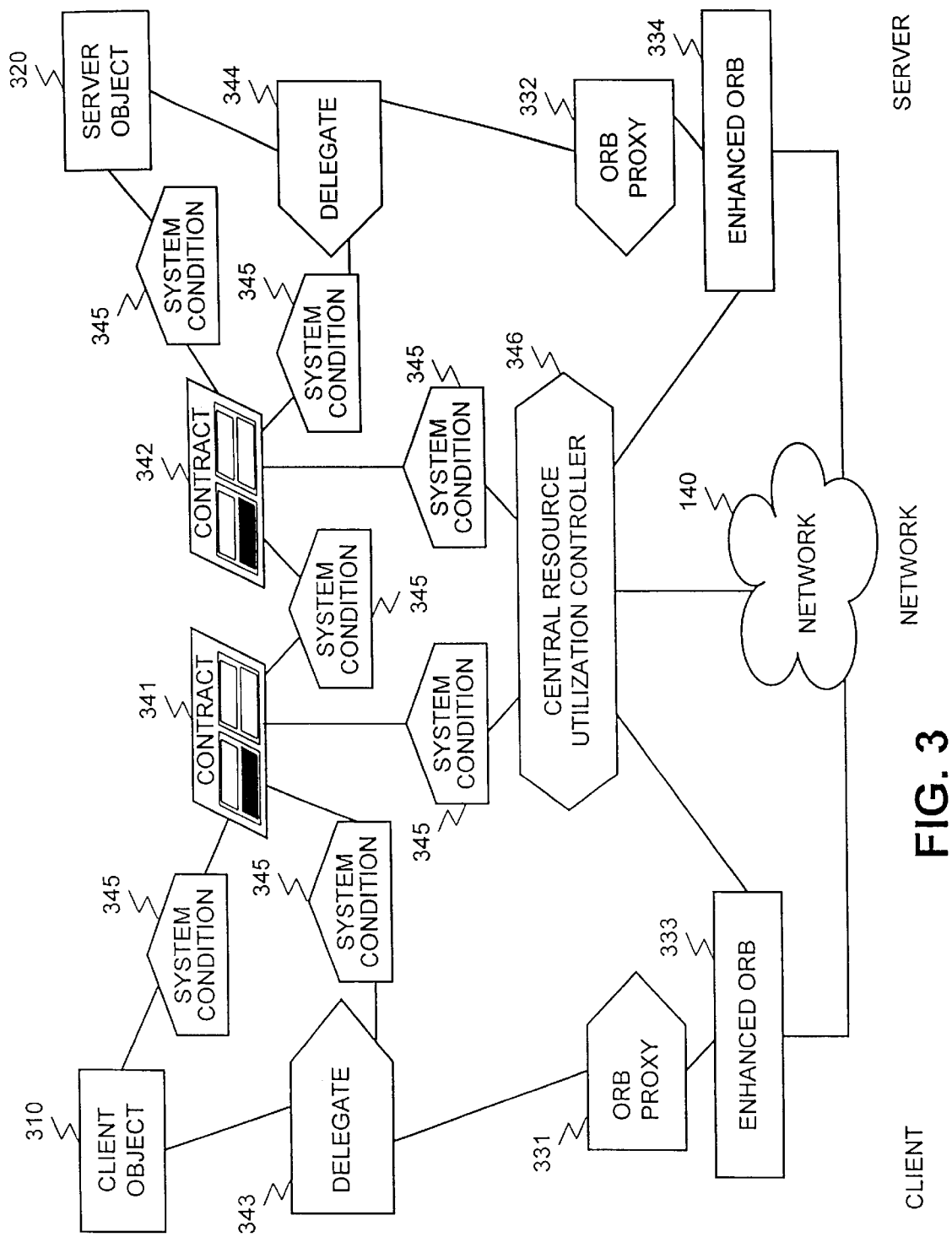
FIG. 3 is a diagram of software components of the distributed system of FIG. 1.

FIG. 3 is a diagram of software components of the exemplary distributed system 100. Due to the distributed nature of system 100, the software components shown in FIG. 3 may physically reside on the computer hosting the client (e.g., computer 110 of FIG. 1), the computer hosting the remote object (e.g., computer 120), or some other computer on the network. In addition, the software components may be heterogeneous with respect to programming languages.

Client object 310 and server object 320 represent software components of a standard distributed object-oriented application. Typically, both the client and server objects 310 and 320 are written by an application developer.

The object request broker (ORB) proxies 331 and 332 and enhanced ORBs 333 and 334 represent conventional middleware for establishing client-server relationships between objects. One conventional ORB is the CORBA ORB. The CORBA ORB is an application framework that provides interoperability between objects built in different languages and running on different machines in heterogeneous distributed environments. The CORBA ORB is described generally by Steve Vinoski in *CORBA: Integrating Diverse Applications Within Distributed Heterogeneous Environments*, IEEE Communications Magazine, Vol. 35, No. 2, February 1997, which is hereby incorporated by reference.

The enhanced ORBs 333 and 334 are ORBs equipped with additional software control mechanisms that enable the resulting ORB to deliver its services with improved QoS for a system resource or resources of interest. Several examples of enhanced ORBs currently exist in prototype or commercially available implementations. These enhanced ORBs provide QoS assurances for such resources as network communications, remote object replication, and load balancing of processor utilization across multiple hosts.

Commercially available examples of enhanced ORBs include Visigenic's VisiBroker ORB and Genuity's Hopscotch. VisiBroker incorporates components called Smart Agents and Object Activation Daemons to implement load balancing across CORBA objects. Hopscotch uses replication of world wide web pages to provide improved responsiveness in the presence of network congestion and high web server loading.

Within a distributed software system using QuO, such as the distributed system 100, the QoS improvements provided by the enhanced ORBs 333 and 334 are made available to client applications through mechanisms described below. A benefit introduced by the QuO system is to provide a set of simple, standard mechanisms that define the interface between enhanced ORBs and the applications implemented using these ORBs. These standard mechanisms allow the developers of enhanced ORBs to make their services readily available to a large community of QuO application developers. In addition, standard mechanisms enable application developers to make use of QoS-enhanced ORBs without in-depth knowledge of the implementation details of the enhanced ORBs.

To provide QoS, the ORBs operate in conjunction with other software components within the QuO system. The contracts 341 and 342, the delegates 343 and 344, the system conditions 345, and the central resource utilization controller 346 represent the basis of the QuO system. Each of these elements is described more fully below.

CONTRACTS

A QuO contract is a software component that documents the QoS required by a client and the QoS actually delivered by the system at a particular time. The contract is accessed by the client program through system conditions and through QuO delegates.

QuO contracts define varying levels of QoS, called "regions." Some of these regions document the QoS required by the client, such as a requirement for a specified number of replicated objects, and are called "negotiated regions." Other regions document the QoS actually delivered at a particular time and are called "reality regions." When the client's required QoS falls within the QoS parameters of a negotiated region, and the actual measured QoS falls within the bounds of a reality region, the contract is said to be "in" those regions.

Contract regions may contain other regions as needed to describe system QoS. A contract may describe the desired behavior at the time when the system detects a "transition," a condition that causes the contract to change state from one region to another. This transition behavior may be executed within the client application, or elsewhere in the running application, and is typically used to request changes to the allocation of system resources or to adapt to changing resource availability.

Figure 4:
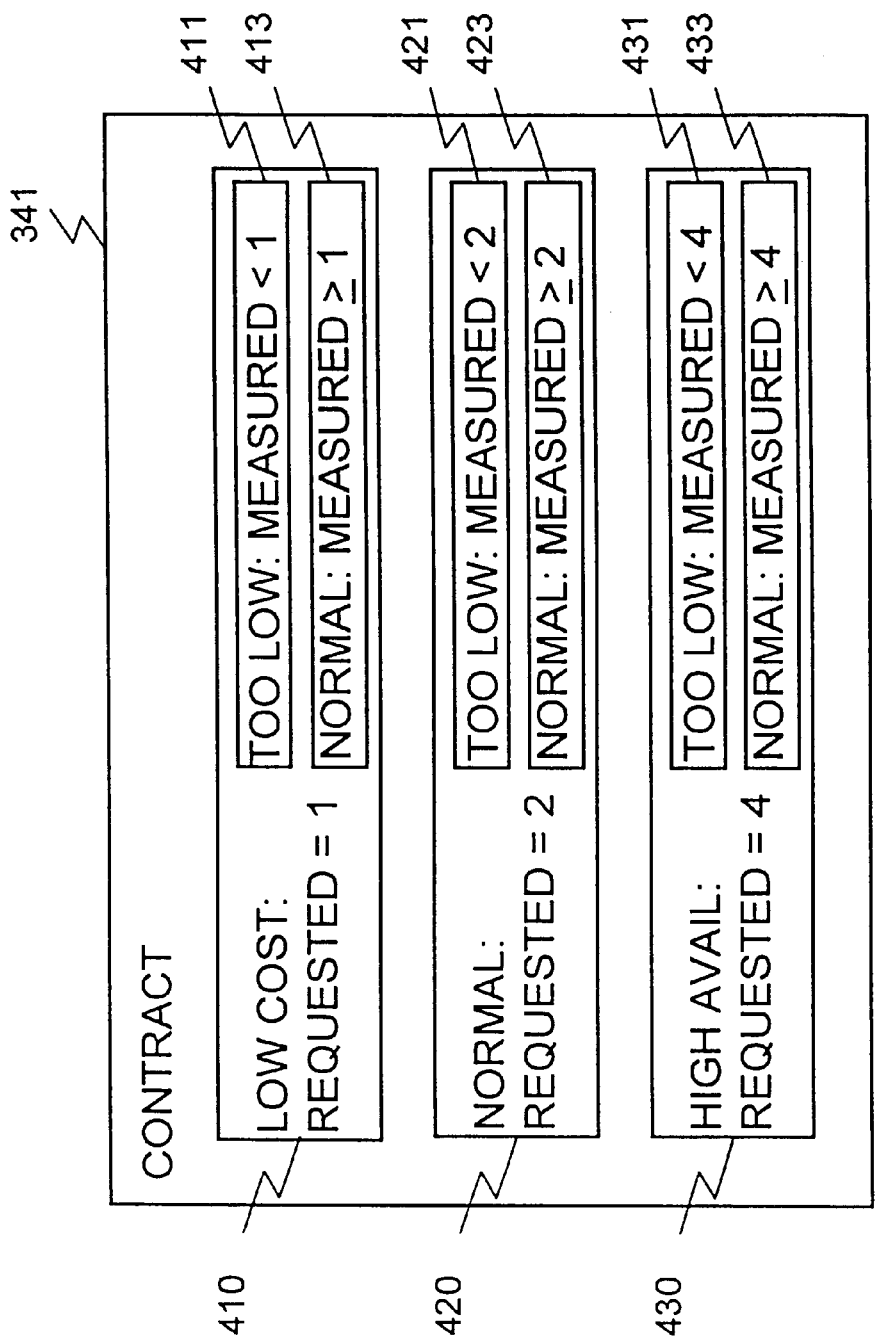
FIG. 4 is a graphical representation of an exemplary QuO contract within the distributed system of FIG. 1.

FIG. 4 is a graphical representation of a QuO contract for a high-availability application, such as contract 341 in FIG. 3. The three negotiated regions are named "Low Cost" 410, "Normal" 420, and "High Availability" 430, and specify three levels of available QoS that may be requested by the client.

In this particular example, the specified QoS levels are interpreted by the QuO system as specifying the required number of replicated copies of a remote object whose QoS is described by the contract. The QuO system uses the underlying ORB, which has been enhanced with an object replication feature, to create and maintain the specified number of replicas of the remote object.

The contract receives its input information by monitoring the values of specific QuO system conditions. This monitoring is achieved by indicating in the contract's description that the contract "monitors" some collection of system conditions. For instance, the example contract depicted in FIG. 4 monitors a system condition that permits the client object to specify the desired QoS level.

In the example contract 341, each of the negotiated regions contains two reality regions. The "Low Cost" negotiated region 410 includes reality regions "Low Cost.Too Low" 411 and "Low Cost.Normal" 413. The "." notation indicates the nesting of a reality region within a negotiated region. The "Normal" negotiated region 420 includes reality regions "Normal.Too Low" 421 and "Normal.Normal" 423. The "High Availability" negotiated region 430 includes reality regions "High Availability.Too Low" 431 and "High Availability.Normal" 433.

Figure 5:
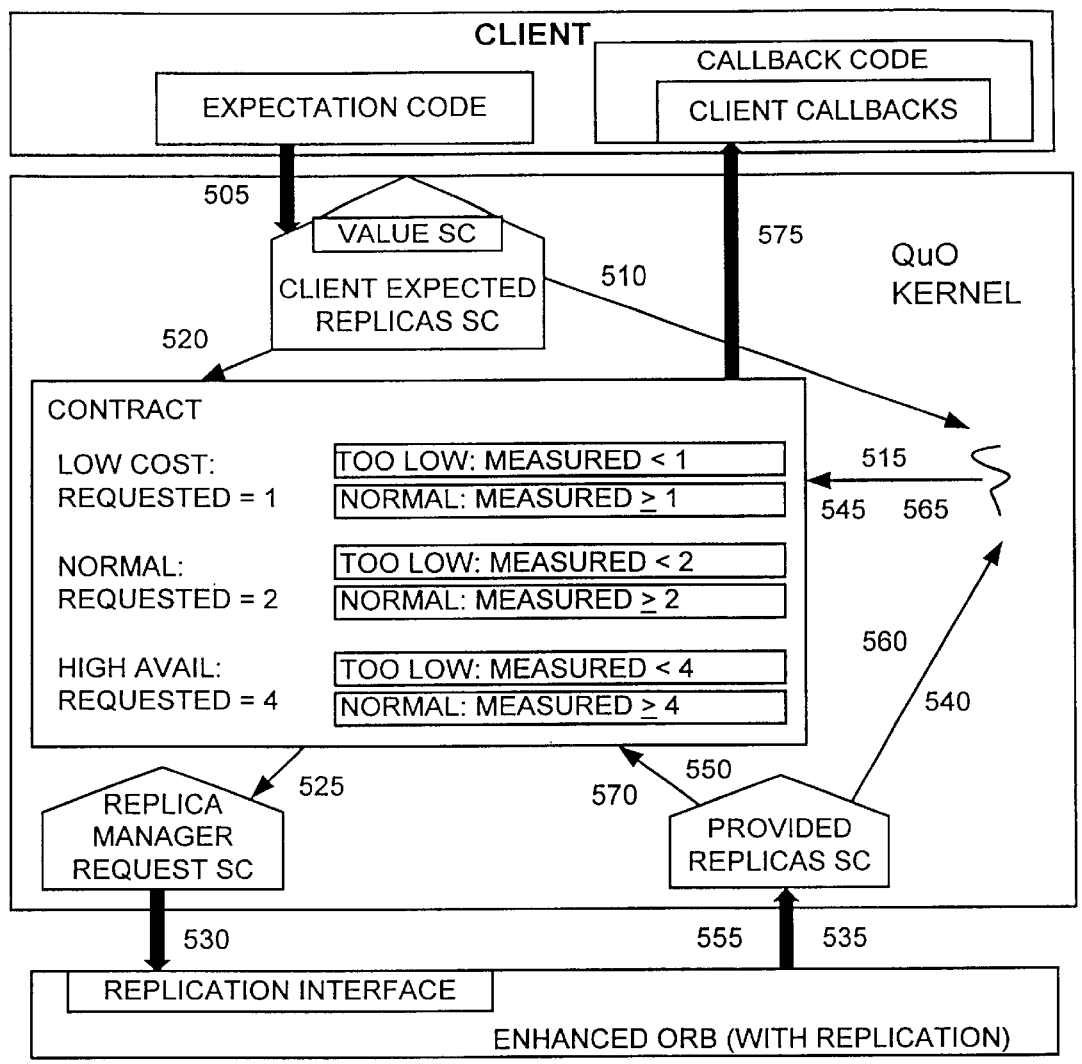
FIG. 5 is an exemplary diagram of interoperability of the contract of FIG. 4 within the distributed system of FIG. 1.

FIG. 5 is an exemplary diagram of interoperability of the contract of FIG. 4 within the QuO system of FIG. 3. In this example, the contract monitors three system conditions: (1) a client expected replicas system condition for setting the value of client expected replicas, (2) a replica manager request system condition that controls the behavior of an enhanced ORB with replication, and (3) a provided replicas system condition that reports the number of remote object replicas currently in existence. The contract interacts with these system conditions to maintain and report the level of QoS provided by the QuO system.

A client object (or program) establishes its QoS expectations using expectation code to set a value of the client expected replicas system condition [step 505]. After updating its value, the system condition releases control to a thread of the QuO kernel that is responsible for notifying certain contract(s) of changes in the value [step 510]. Upon receiving control, the thread instructs the contract to reevaluate [step 515]. The contract reads the modified system condition value and uses it to choose the active negotiated region [step 520]. If, for example, the client sets the value of the system condition to 2, then the contract enters the "Normal" negotiated region and attempts to assure that there are two replicas of the remote object.

The contract attempts to achieve this desired QoS level by adjusting the value of the replica manager request system condition or other additional system conditions [step 525]. The replica manager request system condition uses an interface common to conventional enhanced ORBs to change the behavior of the enhanced ORB, as instructed by the contract [step 530].

The enhanced ORB sets the value in the provided replicas system condition equal to the number of remote object replicas currently in existence [step 535]. If the desired QoS is achieved, the value of the system condition will be 2. The provided replicas system condition then releases control to the thread of the QuO kernel [step 540]. Upon receiving control, the thread instructs the contract to reevaluate [step 545]. The contract reads the system condition value and uses it to choose the active negotiated region [step 550]. If the QoS is achieved, the contract enters the "Norrnal.Normal" reality region.

If at any time the enhanced ORB detects a change (favorable or unfavorable) in the measured QoS being delivered, it modifies the value of the provided replicas system condition [step 555]. A change in QoS may occur if one of the replicas fails and the enhanced ORB cannot correct the failure. Assume, for example, that the enhanced ORB changes the value of the system condition to 1.

In response to the change, the provided replicas system condition releases control to the thread of the QuO kernel [step 560]. Upon receiving control, the thread instructs the contract to reevaluate [step 565]. The contract reads the system condition value and uses it to choose the active negotiated region [step 570]. Since the QoS has not been achieved, the contract transitions to the "Normal.Too Low" reality region. If the client has registered for notification of this transition, the contract notifies the client to execute a callback routine in the client code (or the contract causes a method of a QuO system condition to execute), thereby giving the client an opportunity to observe the degraded QoS and modify its behavior accordingly [step 575].

The contract is written in a contract description language (CDL), a high-level language, and then compiled into an object-oriented programming language. A contract code generator accepts, as input, text containing the CDL description of a contract. The code generator is based on Sun Microsystems' existing parser for CORBA IDL, plus standard UNIX compiler construction tools, including the YACC (Yet Another Compiler Compiler) parser generator. Both code generators produce compilable code in the Java programming language as an output. The use of code generators within distributed object-oriented development environments is common practice. For example, implementations of development environments for CORBA-compliant ORBs include code generators to translate CORBA IDL to compilable code.

The CDL description contains definitions of the contract regions, identification of the system conditions that are used to monitor and control QoS, as well as compilable Java code fragments to be executed upon contract region transition. This description is parsed and analyzed by the code generator and may be reduced to compilable C++code that executes the functions of the QuO contract.

FIG. 6 is an exemplary diagram of a CDL description of a simplified version of the contract shown in FIG. 4. The contract defines two negotiated regions, namely "Low Cost" and "Available" regions. Each of these negotiated regions contains three nested reality regions. For example, the contract enters reality region "Available.Low" when the client has requested multiple replicas of the remote object but the system measures fewer actual replicas than the client has requested.

In addition, the CDL description identifies the QuO system conditions used to manipulate and monitor QoS, such as the client expected replicas system condition that the client uses to establish the required number of remote object replicas. Finally, the contract identifies two different types of transition behavior. Under this contract, transitions between different reality regions within the same negotiated region are handled by invoking callbacks to the client program. For instance, if the contract region transitions from "Available.Low" to "Available.Normal," indicating that the system has restored the client's required number of remote object replicas, then the contract invokes a ClientCallback.availability$_{13}$ back$_{13}$ to$_{13}$ normal( ) method. The client application may use this opportunity to change its operating behavior in accordance with the improved QoS.

The second type of transition behavior shown in the example contract handles transition between negotiated regions. When the negotiated contract region transitions from "Low Cost" to "Available," the contract invokes a ReplMgr.adjust$_{13}$ degree_of_replication( ) method with the required number of replicas supplied as an argument. This method instructs the system's replication manager to create additional replicas of the remote object.

DELEGATES

A QuO delegate is a software component that provides for QoS-adaptive behavior, while exhibiting the functional behavior of an ORB proxy object. That is, a QuO delegate has the same interface description language (IDL) interface as the remote object on which the client program performs a remote method invocation. Unlike the ORB proxy, however, the QuO delegate contains code that checks the current regions of the contract governing the client-server interaction and changes behavior appropriately.

When a client requests a remote method invocation, the QuO delegate determines whether the system offers the client-specified QoS for the invocation. If the system cannot provide an acceptable QoS, the delegate adapts its behavior accordingly. For example, the delegate may delay the remote method invocation until the QoS becomes acceptable or may abort the invocation altogether.

Like a QuO contract, a QuO delegate is typically generated automatically by a code generator that compiles a high-level description into an object-oriented programming language. In the QuO system, the QuO delegate's alternate behaviors are described in a structure description language (SDL). The SDL description of a delegate's behavior makes explicit reference to the regions of a specific contract.

The code generator reads the delegate's SDL description, the contract's CDL description, and the IDL description of the server object's interface. The code generator combines these three components to generate programming language instructions for the delegate.

FIG. 7 is an exemplary diagram of a SDL description of a simplified version of a delegate. On a client program's invocation of the "someMethod" method call, the delegate exhibits adaptive behavior, depending on the current contract region. If the current contract region is "Increment," the delegate simply executes the remote method call normally and returns the value to the client program. However, if the current contract region is "Decrement," then the delegate instead invokes the remote object's "altMethod" method, using the supplied argument, and returns the value resulting from this alternate method call to the client program.

SYSTEM CONDITIONS

A QuO system condition is a software component that is used by other components of the QuO system to provide QoS control and monitoring capabilities. The object-oriented interface to a system condition includes a get_value method that returns the current value of the system component that is controlled or monitored by the system condition.

A central resource utilization controller 346 (FIG. 3) provides real-time monitoring of system components and resource utilization. The controller 346 may include a conventional computer, such as an IBM-compatible computer, to allocate scarce resources on a system-wide basis and to monitor and control the use of a particular shared resource or set of resources using the QuO system conditions 345. To accomplish this task, the controller 346 may use automated, manual, or semi-automated resource allocation algorithms.

Because the QuO system will often read the value of a system condition object in order to check the current contract regions during the execution of a remote method invocation, the get_value method returns a value immediately, without lengthy computation or communication. In addition, a set_value method is used to change the value of system conditions that permit direct modification of their values.

System conditions are implemented directly in an object-oriented programming language, such as Java. The conditions provide a simple, direct application programmer's interface (API) to complex objects within the QuO system.

For example, three system conditions are shown in FIG. 5. The client uses the client expected replicas system condition to specify the QoS required. Because the contract monitors this system condition, its reality region transition behavior is triggered by changes to the client's QoS requirements. The replica manager request and provided replicas system conditions respectively control and monitor the number of remote object replicas maintained by the enhanced ORB.

In conventional systems, the software API to an enhanced ORB requires the manipulation of many parameters and software controls in order to achieve improved QoS. In the QuO system, however, these parameters are controlled by one or more system conditions, leaving only a small number of adjustments to be controlled by the QuO contract.

In FIG. 5, although the enhanced ORB requires specification of many parameters (e.g., communication timeouts, replica hosting strategy), only control of the actual number of replicas is passed onto the QuO contract. Similarly, the provided replicas system condition monitors the performance of the enhanced ORB and provides as its value an estimate of the number of replicas in existence at any given time. The contract monitors this system condition in order to correctly update the current reality region.

SYSTEM PROCESSING

Figure 8:
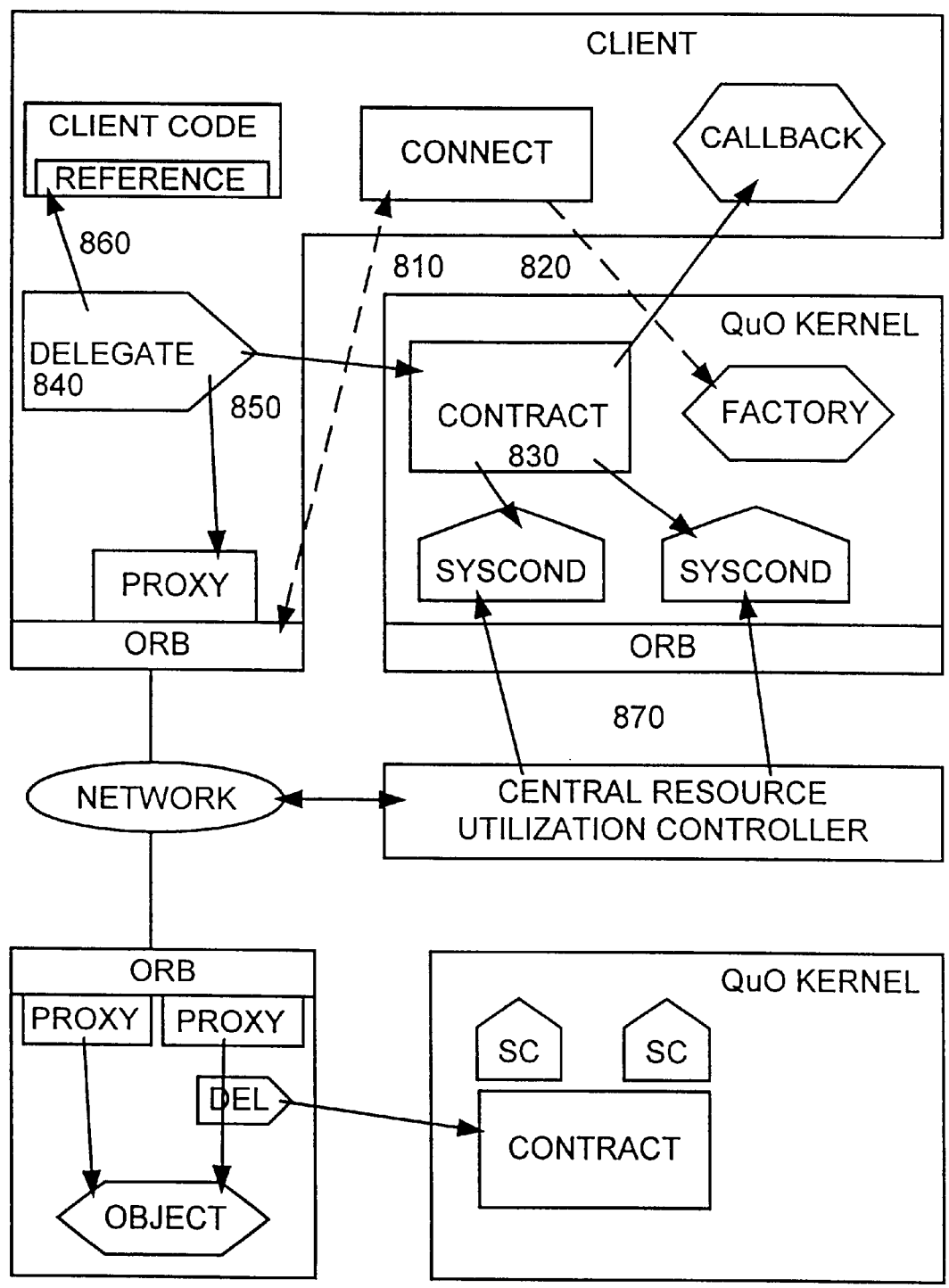
FIG. 8 is an exemplary diagram of initialization processing.

FIG. 8 is an exemplary diagram of initialization processing. The client's connect routine initializes the QuO application. The connect routine calls the ORB to bind to a remote object and provides the identity of the remote object [step 810]. The ORB returns a reference to the ORB proxy.

The connect routine also instructs a QuO kernel factory to create the required system conditions and the contract [step 820]. The QuO kernel factory is an object whose duty it is to create other objects. In this case, the QuO kernel factory creates the system conditions and contract when instructed by the client.

After creating the contract, the QuO kernel factory stores in the contract interoperable object references (i.e., references to objects that are passable between ORBs) to the system conditions and to a callback routine in the client program [step 830]. Next, the client program creates a delegate [step 840] and stores in it references for the remote object and the contract [step 850]. Finally, the delegate identifies itself to the client code [step 860].

Optionally, the QuO kernel may publish the interoperable object references stored in the contract to allow external access to the system conditions [step 870]. External access to the system conditions may be required by the central resource utilization controller so that the controller can monitor system operation and status.

Figure 9:
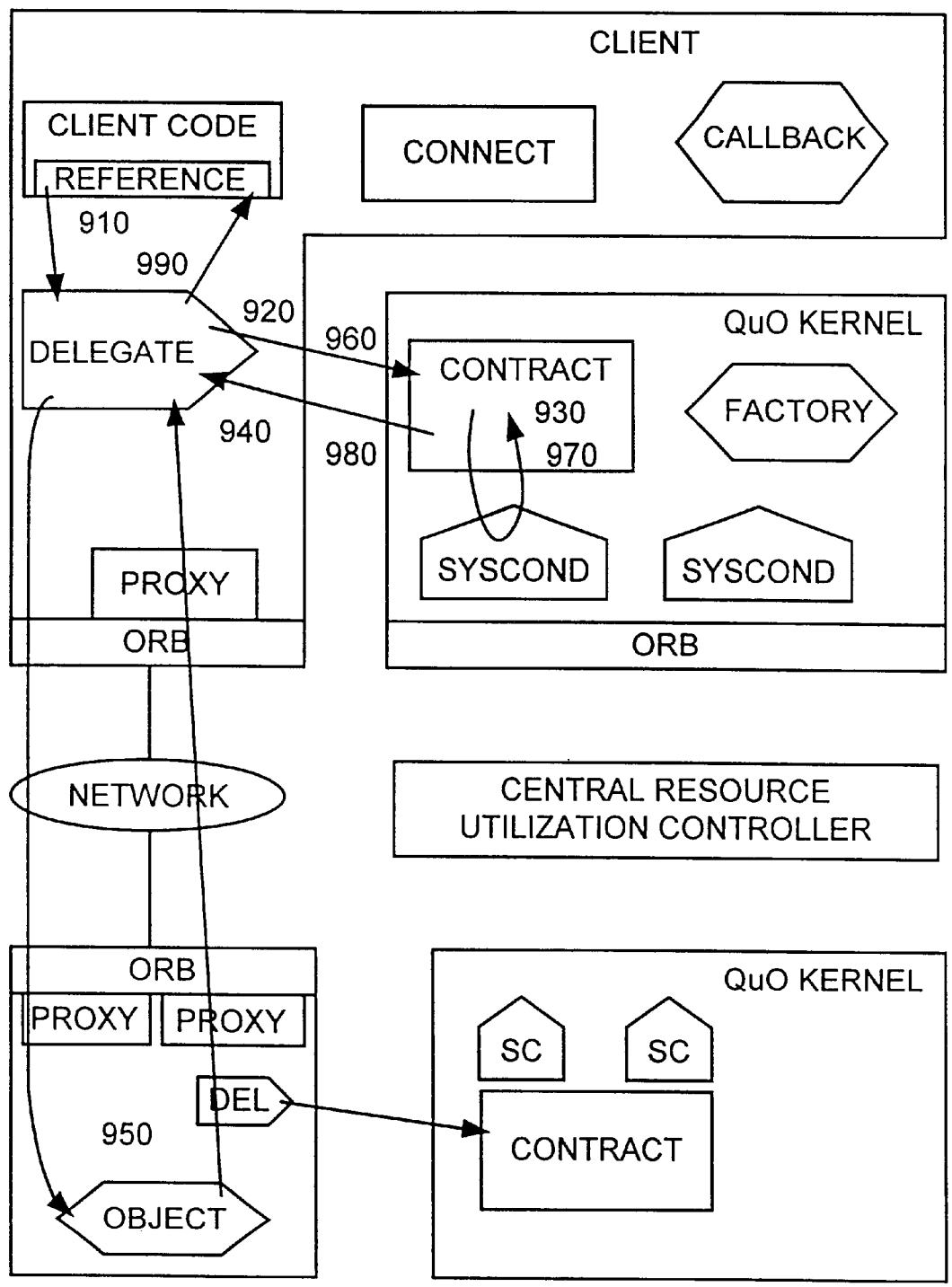
FIG. 9 is an exemplary diagram of a method invocation on a remote object within the distributed system of FIG. 1.

FIG. 9 is an exemplary diagram of a method invocation on a remote method within the distributed system 100 of FIG. 1. When a client program desires to perform a remote method invocation, the client calls a QuO delegate and informs the delegate of the identity of the remote method [step 910]. In response, the delegate requests that the contract identify the current contract region [step 920].

The contract sends a pre_method signal to all registered system conditions to update the current system condition values [step 930]. The contract determines the current contract region from the system condition values and notifies the delegate of $=_{13}$ the current region [step 940]. If the current region is acceptable, the delegate passes the method invocation onto the remote object via the ORB proxy [step 950]. When the ORB proxy returns the result from the remote invocation, the delegate forces a contract reevaluation [step 960].

The contract sends a post_method signal to all registered system conditions to again determine the current contract region [step 970]. The contract then provides the delegate with the current region [step 980]. The delegate forwards the result to the client, completing the method invocation [step 990].

Figure 10:
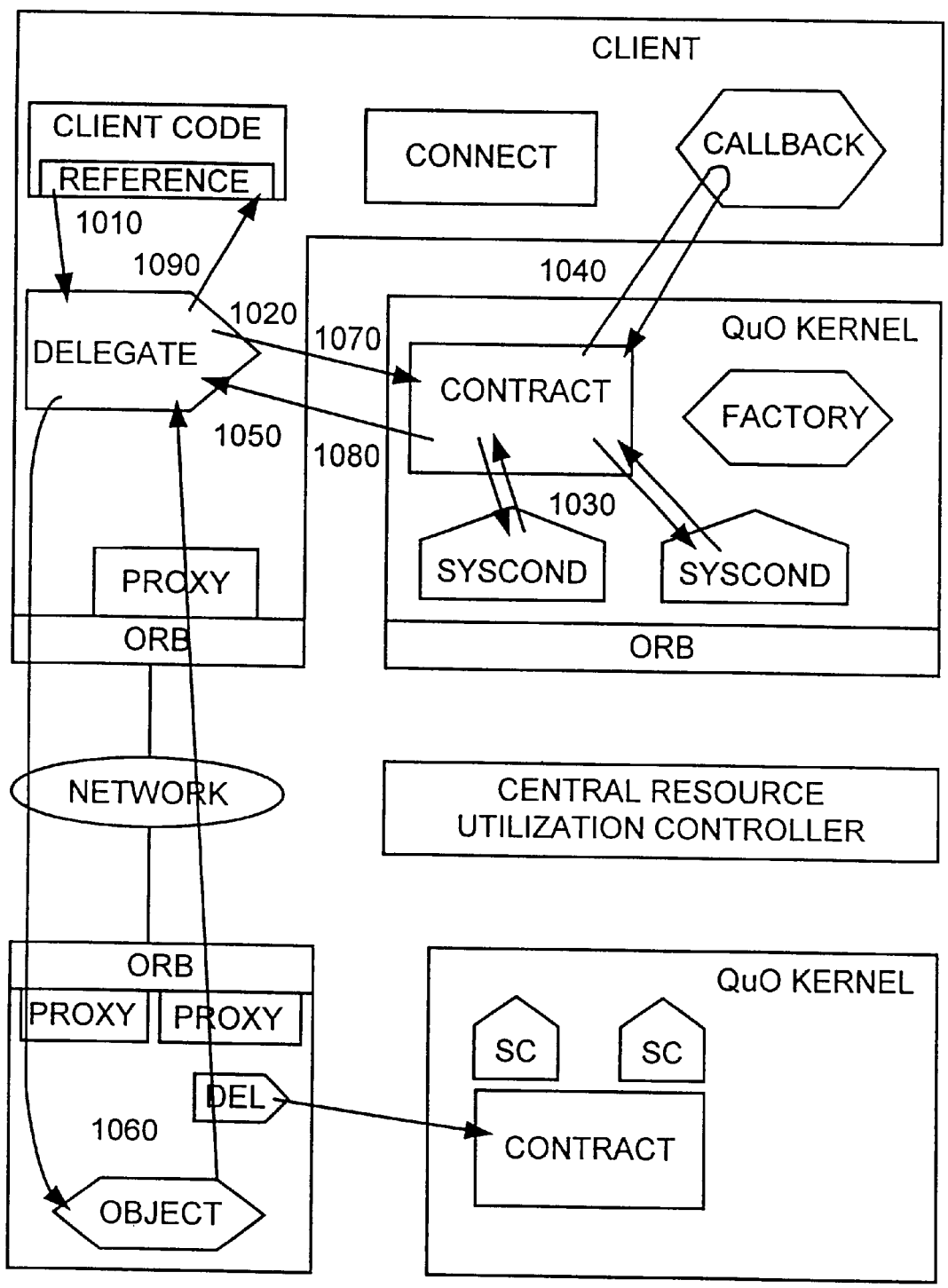
FIG. 10 is an exemplary diagram of processing performed when transitions occur between contract regions.

The exemplary diagram of FIG. 9 assumes that there are no transitions in the contract regions. FIG. 10 is an exemplary diagram of processing performed when transitions occur between contract regions. When the client program desires to perform a remote method invocation, the client calls a delegate and informs it of the identity of the remote method [step 1010]. In response, the delegate evaluates the contract to determine the current contract region [step 1020].

The contract sends a pre_method signal to all registered system conditions to update the current contract region [step 1030]. The contract takes a snapshot of the d values of the registered system conditions. The contract then reevaluates the region and, in this case, determines that there has been a transition between regions. The region transition triggers a callback to the client to permit the client the opportunity to adapt to the change in system conditions [step 1040].

The contract then notifies the delegate regarding the current region [step 1050]. If the current region is acceptable, the delegate passes the method invocation onto the remote object via the ORB proxy [step 1060]. When the ORB proxy returns the result from the remote invocation, the delegate forces a contract reevaluation, as described above [step 1070]. The contract returns the current region to the delegate [step 1080], which forwards the result to the client, completing the method invocation [step 1090].

Figure 11:
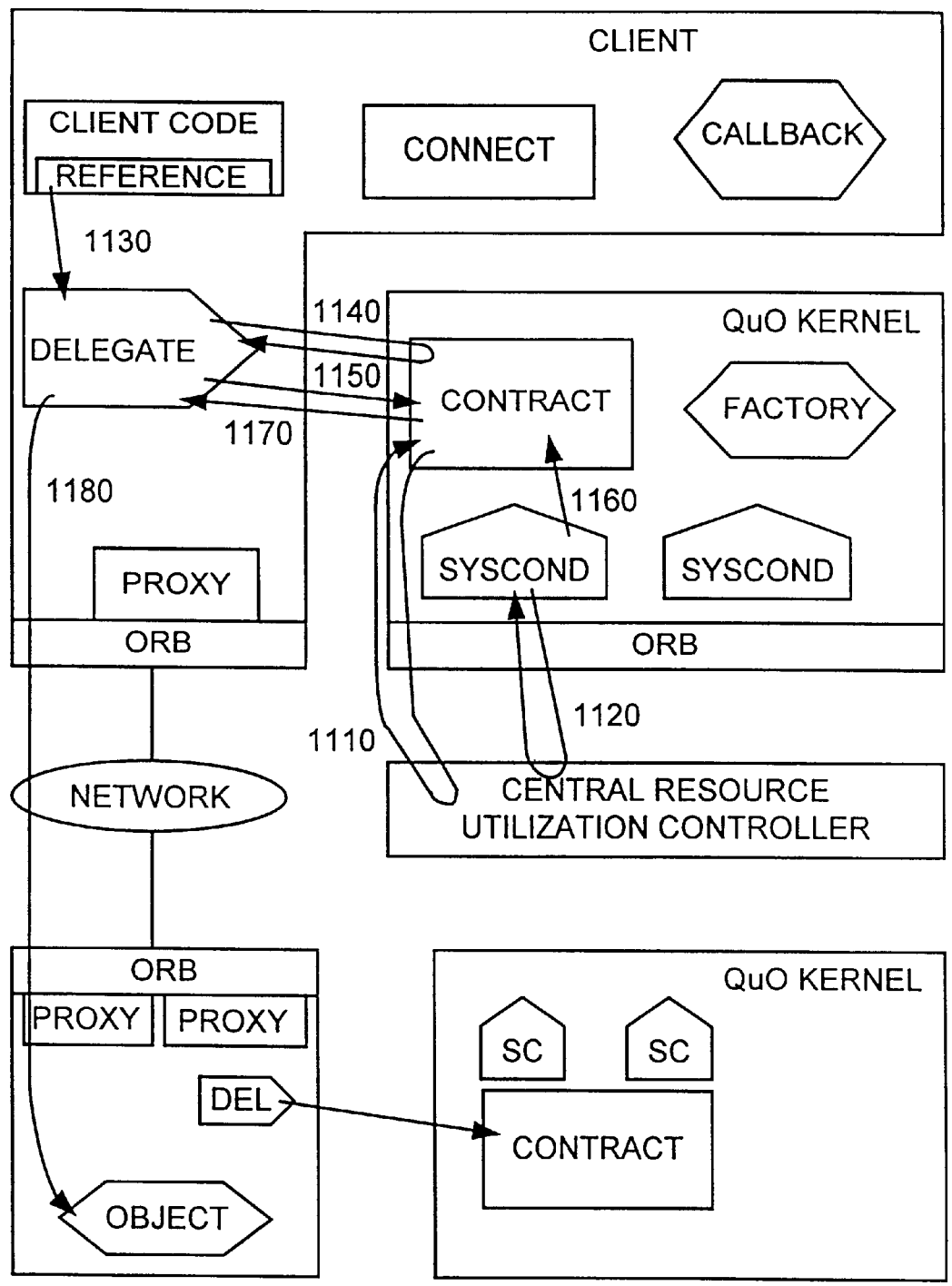
FIG. 11 is an exemplary diagram of processing for adapting to a region transition.

Region changes can also trigger control mechanisms and delegate adaption processing in order to attempt to achieve the desired QoS. FIG. 11 is an exemplary diagram of such processing. When a region transition occurs, the contract sends a control command to a control object of the central resource utilization controller [step 1110]. A system condition monitors the status of a control process of the control object [step 1120].

Assume that the client program requests a remote method invocation at this time [step 1130]. In response, the delegate evaluates the contract to determine the current region [step 1140]. Assume that the current region is unacceptable, meaning that the required level of QoS is unavailable. In this case, the delegate may choose to delay the remote method invocation until the enhanced ORB can deliver the required QoS. Alternately, the delegate may choose not to complete the remote method invocation in the absence of the required QoS. Instead, the delegate may simply fail, returning an exception to the client.

If the delegate decides to delay the remote method invocation, the delegate sends a block signal to the contract [step 1150]. When the system condition detects a change in the status of the control process, it triggers reevaluation of the contract [step 1160]. The contract reevaluates and if the change in the control status was favorable, returns the block signal to the delegate indicating that the current region is now acceptable [step 1170]. The delegate then proceeds with the remote method invocation [step 1180].

The systems and methods consistent with the present invention provide a mechanism for the specification and satisfaction of application QoS requirements in a distributed, object-oriented computer system with various components, including both hardware and software. The mechanism supplies: (1) a contract used by client software components to specify the QoS required, independent of the specific type of resource being requested; (2) a system condition used by the system to provide real-time control over and visibility into third party software components that provide QoS assurances; (3) a delegate used by client software components to adapt run-time behavior to the actual QoS being delivered by the system; and (4) a multi-tier adaption scheme that provides notification to the client when the actual QoS delivered varies from the QoS specified in the contract.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, computer 100 (FIG. 2) has been described as containing the QuO kernel. However, this need not be the case. The QuO kernel may execute on computer 120 (FIG. 1), device 130, or some other network device.

What is claimed is:

1. A method for providing a quality of service by a distributed system, the method comprising the steps of:

generating at least one system condition object storing a value;

monitoring at least one resource in real time using the system condition object;

setting the value of the system condition object in response to the monitoring of the resource;

defining at least one negotiated region;

determining a quality of service provided by the system based on the value stored in the system condition object;

defining at least one reality region; and regulating activity within the distributed system based on the determined quality of service, wherein the system activity includes a remote method invocation, and wherein regulating system activity includes:

deciding whether the determined quality of service is at an acceptable level, by evaluating at least one of the reality region and the negotiated region, wherein the negotiated region may include one or more reality regions, and performing the remote method invocation when the quality of service is at the acceptable level or delaying the remote method invocation when the quality of service is at an unacceptable level.

2. The method of claim 1, wherein the monitoring step includes the substep of:

periodically monitoring one of network communications, memory, disk storage, encrypted communications, replication of objects, and processor utilization in the system.

3. A distributed system for providing quality of service, comprising:

a controller that monitors a system resource;

a first system condition that stores a value based on a state of the monitored system resource;

a second system condition that stores a value based on a required quality of service;

a contract that records a current level of quality of service provided by the system, defines at least one reality region, and defines at least one negotiated region, and wherein the contract includes means for reading the value stored in the first system condition, and means for determining the current level of quality of service based on the value read from the first system condition; and a delegate that regulates system activity based on a relationship between the current quality of service and the required quality of service, wherein the delegate includes:

means for deciding whether the determined quality of service is at an acceptable level by evaluating at least one of the negotiated region and the reality region, wherein the negotiated region may include one or more reality regions, and means for performing the remote method invocation when the quality of service is at the acceptable level, or for delaying the remote method invocation when the quality of service is at an unacceptable level.

4. The system of claim 3, wherein the controller includes:

means for periodically monitoring one of network communications, memory, disk storage, encrypted communications, replication of objects, and processor utilization in the system.

5. A distributed system for providing a quality of service, the system comprising:

means for generating at least one system condition object storing a value;

means for monitoring at least one resource in real time using the system condition object;

means for setting the value of the system condition object in response to the monitoring of the resource;

means for defining at least one negotiated region;

means for determining a quality of service provided by the system based on the value stored in the system condition object;

means for defining at least one reality region; and means for regulating system activity based on the determined quality of service, wherein the system activity includes a remote method invocation, and wherein means for regulating system activity includes:

means for deciding whether the determined quality of service is at an acceptable level, by evaluating at least one of the reality region and the negotiated region, wherein the negotiated region may include one or more reality regions, and means for performing the remote method invocation when the quality of service is at the acceptable level or for delaying the remote method invocation when the quality of service is at an unacceptable level.

6. A computer-readable medium containing instructions for controlling at least one computer to perform a method that assures a quality of service provided by a distributed system, the method comprising the steps of:

generating at least one system condition object storing a value;

monitoring at least one resource in real time using the system condition object;

setting the value of the system condition object in response to the monitoring of the resource;

defining at least one negotiated region;

determining a quality of service provided by the system based on the value stored in the system condition object;

defining at least one reality region; and regulating activity within the distributed system based on the determined quality of service, wherein the system activity includes a remote method invocation, and wherein regulating system activity includes:

deciding whether the determined quality of service is at an acceptable level, by evaluating at least one of the reality region and the negotiated region, wherein the negotiated region may include one or more reality regions, and performing the remote method invocation when the quality of service is at the acceptable level or delaying the remote method invocation when the quality of service is at an unacceptable level.

7. A method for providing a quality of service by a distributed system, the method comprising the steps of:

generating a plurality of system condition objects storing values;

monitoring a plurality of resources in real time using the system condition objects;

setting the values of the system condition objects in response to the monitoring of the resources;

defining a plurality of negotiated regions;

determining a quality of service provided by the system based on the values stored in the system condition objects;

defining a plurality of negotiated regions; and regulating activity within the distributed system based on the determined quality of service, wherein the system activity includes a remote method invocation, and wherein regulating system activity includes:

deciding whether the determined quality of service is at an acceptable level, by evaluating at least one of the plurality of reality regions and the plurality of negotiated regions, wherein the at least one of the negotiated regions may include one or more reality regions, and performing the remote method invocation when the quality of service is at the acceptable level or delaying the remote method invocation when the quality of service is at an unacceptable level.

8. A method for providing a quality of service by a distributed system, the method comprising:

generating at least one system condition object storing a value;

monitoring at least one resource in real time using the system condition object;

setting the value of the system condition object in response to the monitoring of the resource;

defining at least one negotiated region;

determining a quality of service provided by the system based on the value stored in the system condition object;

defining at least one reality region; and regulating activity within the distributed system based on the determined quality of service, wherein the system activity includes a remote method invocation, and wherein regulating system activity includes:

deciding whether the determined quality of service is at an acceptable level, by evaluating the least one of the reality region and the negotiated region, wherein the negotiated region may include one or more reality regions, and selecting an alternate service when the determined quality of service is at an unacceptable level.

9. The method of claim 8, wherein the monitoring step includes:

periodically monitoring one of network communications, memory, disk, storage, encrypted communications, replication of objects, and processor utilization in the system.

* * * * *